(12) United States Patent
Dunbar

(10) Patent No.: US 7,993,526 B2
(45) Date of Patent: Aug. 9, 2011

(54) FEEDBACK CONTROL SCHEME FOR OPTIMIZING DEWATERING PROCESSES

(76) Inventor: James M. Dunbar, Winslow, ME (US)

(*) Notice: Subject to any disclaimer, the term of this patent is extended or adjusted under 35 U.S.C. 154(b) by 318 days.

(21) Appl. No.: 12/405,658

(22) Filed: Mar. 17, 2009

(65) Prior Publication Data

US 2009/0255876 A1 Oct. 15, 2009

Related U.S. Application Data

(60) Provisional application No. 61/044,129, filed on Apr. 11, 2008.

(51) Int. Cl.
*C02F 1/24* (2006.01)
*C02F 1/56* (2006.01)
*C02F 11/14* (2006.01)

(52) U.S. Cl. ........ 210/705; 210/709; 210/710; 210/744; 210/928

(58) Field of Classification Search .................... 210/709
See application file for complete search history.

(56) References Cited

U.S. PATENT DOCUMENTS

| | | | | |
|---|---|---|---|---|
| 4,170,553 A | * | 10/1979 | Lang et al. | 210/709 |
| 4,198,298 A | * | 4/1980 | Zuckerman et al. | 210/739 |
| 4,587,023 A | * | 5/1986 | Srivatsa et al. | 210/744 |
| 4,612,123 A | * | 9/1986 | Eustacchio et al. | 210/709 |
| 5,021,166 A | | 6/1991 | Torpey | |
| 5,377,423 A | | 1/1995 | Nagaoka | |
| 5,620,609 A | * | 4/1997 | Field | 210/745 |
| 5,662,805 A | * | 9/1997 | Cameron et al. | 210/709 |
| 5,846,433 A | * | 12/1998 | Sorensen et al. | 210/709 |
| 5,902,487 A | * | 5/1999 | Pickering et al. | 210/709 |
| 6,048,438 A | | 4/2000 | Rosencrance et al. | |
| 7,303,685 B2 | * | 12/2007 | Clark | 210/709 |

* cited by examiner

*Primary Examiner* — Peter A Hruskoci
(74) *Attorney, Agent, or Firm* — Dennis R. Haszko

(57) ABSTRACT

A method and apparatus for dewatering of effluents through the use of automated optimization using feedback control. The method and apparatus for feedback control optimizes dewatering processes for any water cleansing process that uses retention and/or flocculation aids (e.g., polymers) to impact endpoint water clarity. Disclosed implementations include processing using dissolved air flotation (DAF) and sludge cake formation. The methodology includes real-time monitoring of turbidity and incremental control of polymer to manage changes to turbidity/suspended solids due to operating parameters such as temperature, chemical variations, and mechanical influences.

16 Claims, 10 Drawing Sheets

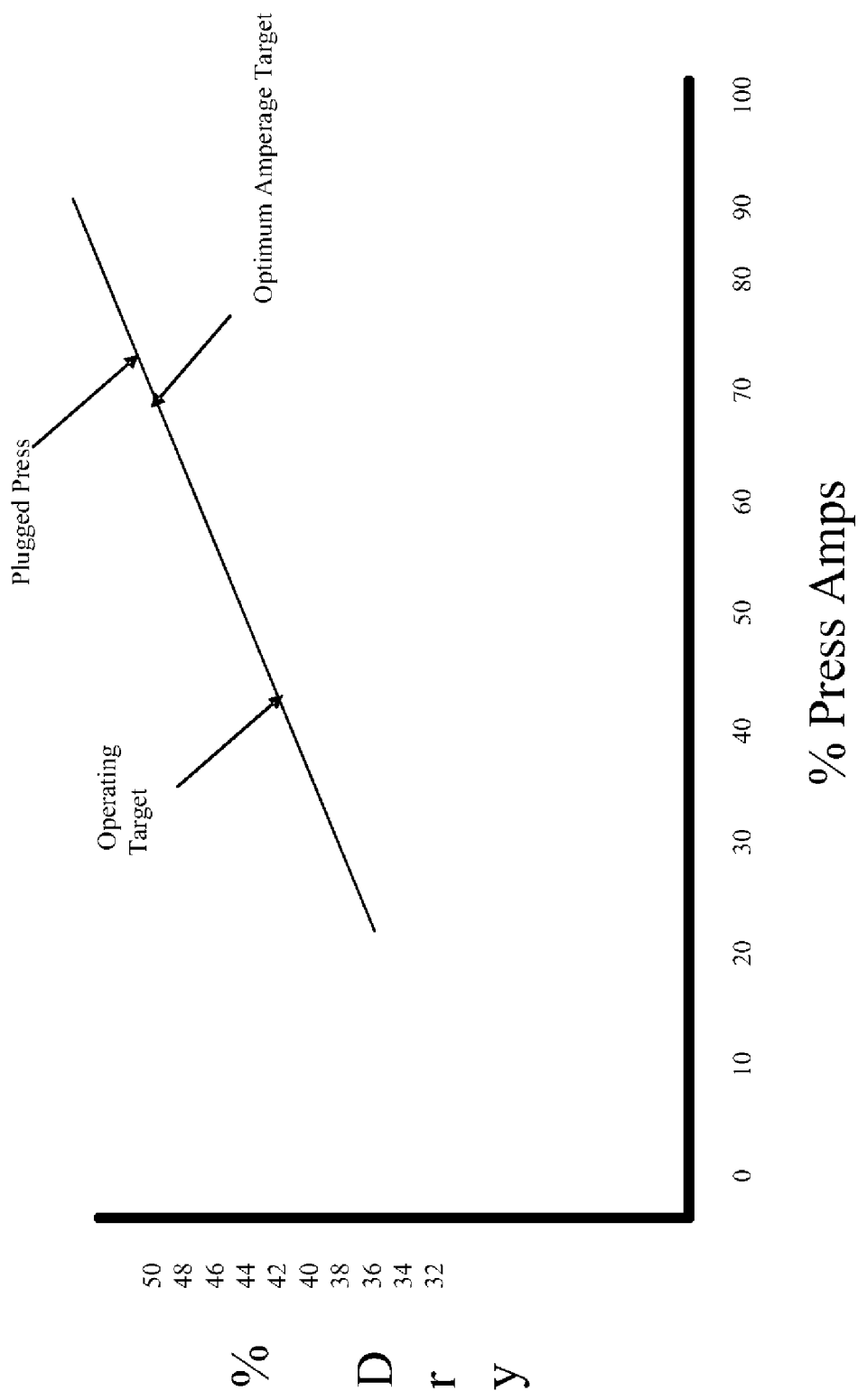

FEEDBACK CONTROL SCHEME FOR OPTIMIZING DEWATERING PROCESSES

This application claims benefit of U.S. Provisional Patent Application Ser. No. 61/044,129, filed 11 Apr. 2008, which is incorporated herein by reference in its entirety.

FIELD OF THE INVENTION

The present invention relates generally to dewatering of effluents. More particularly, the present invention relates to an automated optimization method and apparatus providing feedback control to enhance dewatering processes.

BACKGROUND OF THE INVENTION

Within the papermaking industry, paper or paper board is made by forming an aqueous cellulosic suspension (usually known as a thin stock or paper slurry in general), draining the suspension to form a sheet, and drying the sheet. The draining and drying stages are designed such that the sheet has the desired properties for the final paper or paper board and so generally involves surface treatments to impart adequate smoothness and other performance properties to the sheet. In papermaking, such treatments may involve calendaring for example—i.e., the process of passing paper between the calender rolls to increase the paper's smoothness.

In order to optimize the processes involved in papermaking, it has for many years been standard practice to add various chemical additives to the suspension. Anionic and cationic polymers have been widely used for this purpose. Originally, they were often natural or modified natural polymers, such as cationic starch, but synthetic cationic polymers have been widely used for many years. Their purpose is to act as retention aids and/or as dewatering aids where the given polymer is chosen having regard to the desired property. Such cationic polymer use is common for flat grade machines, while anionic flock polymers are more common in regard to tissue machines. Generally speaking, a retention aid serves to retain fine fibers and fine filler particles in the sheet, whereas a dewatering aid serves to increase the rate of drainage or to increase the rate of drying after drainage. It is well understood that these properties can be mutually conflicting. Accordingly, a large amount of effort has, in recent years, been put into ways of optimizing drainage and dewatering.

The need to improve the quality of the final paper, to avoid loss of fiber or filler fines (e.g., for environmental pollution reasons) and to optimize dewatering (e.g., for energy reduction reasons), means that substantially every significant paper making process has been operated using one or more retention and/or dewatering aids. The research into ways for improving these properties has led to the use of different materials in the same process, including the use of sequential addition of different materials.

One such process is described in U.S. Pat. No. 6,048,438 which involves a method to enhance the performance of polymers and copolymers of acrylamide as flocculants and retention aids whereby the flocculation of solid components of the paper mill slurry is increased leading to improved retention of filler and fiber on the sheet and increased drainage of water from the cellulosic sheet produced. Alternative processes exist using the addition of cationic starch followed by colloidal silicic acid. As well, the addition of a synthetic cationic polymer, followed by shearing of the suspension, followed by the addition of bentonite is a process of particular value in the production of fine papers.

The above-mentioned suspensions that are used as the starting material in all these processes, and to which various retention aids and/or dewatering aids are then added, are in all instances made by pulping a fibrous cellulosic material, generally wood. The pulping involves comminution and suspension of the resultant fibers in water. It is generally necessary to wash and filter the pulp several times. The filtering is normally effected by drainage through a screen. A disadvantage of drainage aids is that they tend to increase the amount of thermal drying that is required. In other words, they accelerate the free drainage but they result in the wet sheet containing a larger amount of trapped water, and so additional thermal drying is required. Accordingly, to increase the efficiency of pulp production and, in particular, to increase the rate of production of dry market pulp, requires a reduction in the amount of thermal energy that is required before drying it. This effectively places a balancing act on the judicious use of dewatering aids.

Dewatering processes and dewatering aids are not limited to the papermaking industry. Indeed, the treatment of waste waters, mineral tailings, oily waste waters, municipal and industrial wastes, and the like, will include one or more steps formed by dewatering processes. Often, the goal of such other dewatering processes is extracting liquid from an end-product termed sludge. Specifically, the liquid component is extracted from such solid materials as fibers, colloids, and the like, as the suspension or sludge is deposited onto a moving perforate conveyor belt which acts as a filter. Alternatively, the sludge may be formed by the separation of liquid suspension by means of a centrifugal separator, centrifuge vacuum filter, belt filter press, screw press, or some similar device. Dewatering processes this type are particularly useful in connection with the treatment of sewage sludge, but may also find application in the papermaking industry or in the chemical industry, where the liquid component of a suspension or sludge preparation is to be removed in a continuous operation.

At the end of any industrial process waste treatment system is a mixture of organic solids, ash and water. A system of mechanical dewatering equipment, coagulating/flocculating chemicals and controls algorithms are utilized to dewater the sludge. The ultimate goal of process is to remove the maximum amount of water from the mix to allow the highest sludge dryness. The dryer the sludge, the more options to economically and environmentally dispose of the final waste. Well dried sludge typically has considerable heat value offsetting petroleum fuels use. When the sludge is burned, the volume is reduced by as much as 70% which significantly reduces landfill volumes.

The treatment of sewage sludge has evolved from the previously purely physical separation of its liquid and solid components to prior chemical treatment of the sludge with various conditioning agents such as the colloid producing polyacrylamides. This treatment results in a precipitation effect, which is similar to the flocculation discussed above with regard to papermaking, thus permitting the separation of the water component from the now colloidal sewage prior to mechanical filtration. A conditioning agent is added to a stream of sludge in order to promote the agglomeration of the colloidal particles in the sludge.

Within the input streams of conventional filtering or mechanical dewatering processes there is a sludge stream having suspensions of fibers, colloids, and the like, and a conditioning agent stream having an organic or inorganic material, liquid or solid which, when added to the sludge stream promotes precipitation and or agglomeration of the fine suspensions. Often, a wash water stream is required in certain mechanical dewatering devices to clean the perforate medium and to prevent plugging of the perforations.

Those familiar with dewatering processes recognize that a relationship can be established between a characteristic of the sludge stream, principally the nature and/or the quantity of suspended matter in the liquid carrying medium (i.e., filtrate clarity), and the quantity of (various possible) conditioning agents which may be used to make effective the separation process. The results of the process are a concentrated sludge stream and wastewater. Adjusting the proportion of conditioning agent added to the sludge stream will affect the efficiency of the dewatering process, as measured both by the percentage of total solids contained in the sludge stream which are removed in the concentrated sludge stream, (known as the solids recovery efficiency), and also the proportion of solid matter in the concentrated sludge stream (known as the dewatering sludge "solids content", typically expressed as "percent dry solids").

Earlier developments based on improving filtrate clarity measured by a suspended solids meter applied a hill climber scheme with appropriate biasing controls to drive the polymer flow in the desired direction. While such schemes improved filtrate clarity which facilitated sludge drainage thus maximizing final cake dryness, over-drying of the sludge created press plugging and equipment damage.

Those familiar with dewatering processes further recognize that the proportions of conditioning agent and sludge can be controlled in such a manner as to maintain a proportionate relationship between the amount of conditioning agent and the volume and/or solids content of the sludge stream. A typical curve representative of this can be seen in FIG. 7 and applies equally to the principles underlying the present invention. As well, devices can be used to detect the amount of solid matter lost, or passing through, the perforate filtration medium and that this information can, in theory, be used in order to adjust, for example, the volume of conditioning agent added so that an optimum degree of clarity may be achieved in the liquid filtrate passing through the perforate filtration medium.

Such degree of clarity is defined in terms of turbidity or suspended solids. The terms turbidity and suspended solids will be interchangeable throughout this specification. Turbidity is the measurement of the effect that suspended solids has on the transmission of light through an aqueous solution such as water. This is a qualitative measurement where turbidity is measured by shining a light through the water and is reported in nephelometric turbidity units (NTUs). This aspect is seen by way of elements 106 and 409 in prior art FIG. 1 and FIG. 4, respectively. While a turbidity meter 106 as shown may include a single light source to facilitate clarity measurements, a suspended solids meter 409 as shown may include a second light source arranged ninety-degrees from a first light source as suspended solids are less affected by color providing feedback on suspended particles only.

Within FIG. 1 there is shown a simplified schematic of a known dewatering process including a dissolved air flotation device. Gray water (i.e., dirty water produced from some industrial process) is supplied to a tank 101 as effluent from some known industrial process (not shown). A pump 109 moves the gray water through a line to a diffused air flotation device (DAF) 105. In general, a DAF process is a method for separating and removing suspended solids from liquid by attachment of micro size air bubbles to the suspended particles. A flow meter 108 typically resides in the line between the pump 109 and DAF 105 in order to provide information on the rate of gray water flow to the DAF 105. This information is used by a controller 103 that controls the flow ratio of polymer additive relative to gray water. To that end, another flow meter 102 is provided in the polymer feed line so as to provide polymer flow information to the controller 103. The controller 103 uses the information garnered from the flow meters 102 and 108 in order to regulate the polymer flow rate via polymer flow regulator 104 which thereby meters the flow of polymer thus added to the gray water to facilitate flocculation within the DAF 105.

As a product of the flocculation within the DAF 105, waste sludge is separated from the gray water in a manner well known to one skilled in the art of dewatering processes. Removal of the sludge results in a clarified water byproduct having a certain measurable turbidity. A turbidity meter 106 is used to monitor the clarified water byproduct for the desired turbidity readings prior to collection of the clarified water in some form of tank 107. Further processing is possible and is well known within the art of water cleansing and purification to obtain various ranges of water clarity suitable for the given implementation. Typically, an operator will manually set the polymer flow ratio at the controller 103 and monitor the dewatering process by monitoring the properties of the sludge and clarified water products. However, such manual operation is inherently problematic due to the variation in incoming gray water properties coupled with operating variables which necessitate variations in optimum polymer flow required to deliver the optimum filtrate clarity.

Within prior art FIG. 4, there is shown a similar dewatering mechanism involving a sludge press device 417 as mentioned above. In contrast to the dewatering process shown in FIG. 1 which ends as low consistency sludge, the prior art of FIG. 4 begins the dewatering process with relatively aqueous low consistency sludge in storage 401 that is pumped via sludge pump 419 to a flocculation tank 408. A sludge flow meter 403 provides data to a controller 405 which, in conjunction with a polymer flow meter 406, controls the polymer flow ratio by way of a polymer regulator 407 which adds a flocculating polymer to the sludge prior to agitation in the flocculation tank 408. The sludge may then be treated with a pre-thickener within a first stage press 410 whereby a filtrate may be released from the sludge to a filtrate tank 411 and the suspended solids remaining in the filtrate monitored by a suspended solids meter 409.

The pre-thickened sludge is then deposited into the chute 414 of the final stage sludge press 417 which is commonly in the form of a screw press as shown. The level of sludge in the chute is monitored by a chute level transmitter 413 and chute level controller 412 which controls sludge feed flow to the headbox of the screw press to a set point established manually by the sludge press operator. The sludge press 417 is run by an electromechanical press drive 415. The drive 415 itself can be controlled by a sludge feed tank level controller 418 such that the drive speed of the press drive 415 is maintained at a level set point established manually by the sludge press operator. The set point is relative to the level of sludge in sludge storage tank 401 as determined by a sludge tank measurement device 402. Ideally, the established set points for the controllers 405, 412, and 418 provide proper dewatering levels for sludge cakes outputted by sludge press 417 prior to transport and disposal by sludge carriers 416. However, these set points are typically conservatively set to prevent plugging of the sludge press. Such plugging of the press 417 is a function of the sludge dryness as can be seen from FIG. 8. Such conservatism ultimately results in lost throughput potential and reduced dewatering capabilities.

Known control systems which depend on detecting changes in filtrate turbidity do not allow for the fact that turbidity changes can occur for a number of reasons. The chemical and/or the physical make up of the sludge has continually varying properties, such as PH swings, primary to secondary solids ratio, sludge temperature, polymer effectiveness and others. These normal variations in operating conditions lead to significant variations in the filtrate turbidity. Less than optimal filtrate clarity translates—to less than optimal first pass solids retention (i.e., optimal drainage) which translates—to less than optimal sludge cake dryness.

A disadvantage of existing control systems is that, as the various sludge properties change, the required polymer feed rate to achieve optimum clarity requires change. Optimum filtrate clarity can be substantially different pending the type and magnitude of sludge property variances. Equipment suppliers have manufactured many different types of dewatering devices such as screw presses, belt presses, rotary thickeners and dissolved air floatation devices. Chemical suppliers manufactured polymers used to bond the sludge particles which enhanced dewatering. The missing element has been an overall control system to regulate the polymer feed and press feed rate that would allow the maximum sludge cake dryness while protecting presses from plugging. In some instances, a press drive current control scheme has been used to maximize allowed sludge press feed level while attempting to protect the press from plugging. To date, such solutions have not yielded optimum performance.

Within industrial dewatering processes in general, it is therefore desirable to provide improvements to minimize the dewatering agents used while maximizing process throughput and increasing sludge dryness without detrimental sideeffects. Within the clarification processes (e.g., dissolved air floatation, flocculation, and the like), it is desirable to attain the most pure effluent filtrate clarity while minimizing the least amount of flocculant additives.

SUMMARY OF THE INVENTION

It is an object of the present invention to obviate or mitigate at least one disadvantage of previous industrial dewatering processes used within the papermaking industry and within other settings including the treatment of waste waters, mineral tailings, oily waste waters, municipal and industrial wastes, and the like.

In a first aspect, the present invention provides a method for optimizing a dewatering process, the method including: a) determining filtrate clarity of an output of a flocculated effluent; b) automatically adjusting flocculant supplied to the flocculated effluent; c) re-determining the filtrate clarity of the flocculated effluent; and d) repeating steps b) and c) so as to maintain the filtrate clarity within a predetermined range.

In a further embodiment, there is provided an apparatus for optimizing a dewatering process, the apparatus including: an optimization module for receiving sensed filtrate clarity data and providing automated changes in flow rate of a flocculant in response to the sensed filtrate clarity data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 8 is a graphical representation of sludge dryness relative to sludge press amperage within dewatering processes applicable to the present invention.

DETAILED DESCRIPTION

Generally, the present invention provides a method and apparatus for dewatering of effluents through the use of automated optimization using feedback control. This inventive feedback control scheme for optimizing dewatering processes is useful in any water cleansing process that uses retention aids (e.g., polymers) to impact endpoint water clarity. At present, the invention is particularly useful in processes including, but not limited to, dissolved air flotation (DAF) and sludge cake formation. Each such process will be described herein with regard to illustrative embodiments of the present invention. However, it should be understood that such illustrative embodiments are not considered to be limiting, as the present invention is also applicable to water clarification for papermaking, waste water treatment, mining, and a myriad of other industrial settings. Still further, the present invention may be used for tray solids control. Tray solids control involves controlling polymer usage as a retention aid. A low retention leads to a high solids and ash content in the tray which results in numerous defects in the paper, while high retention may lead to poor flocculation with all its inherent problems, such as poor formation in the finished sheet.

Figure 1:
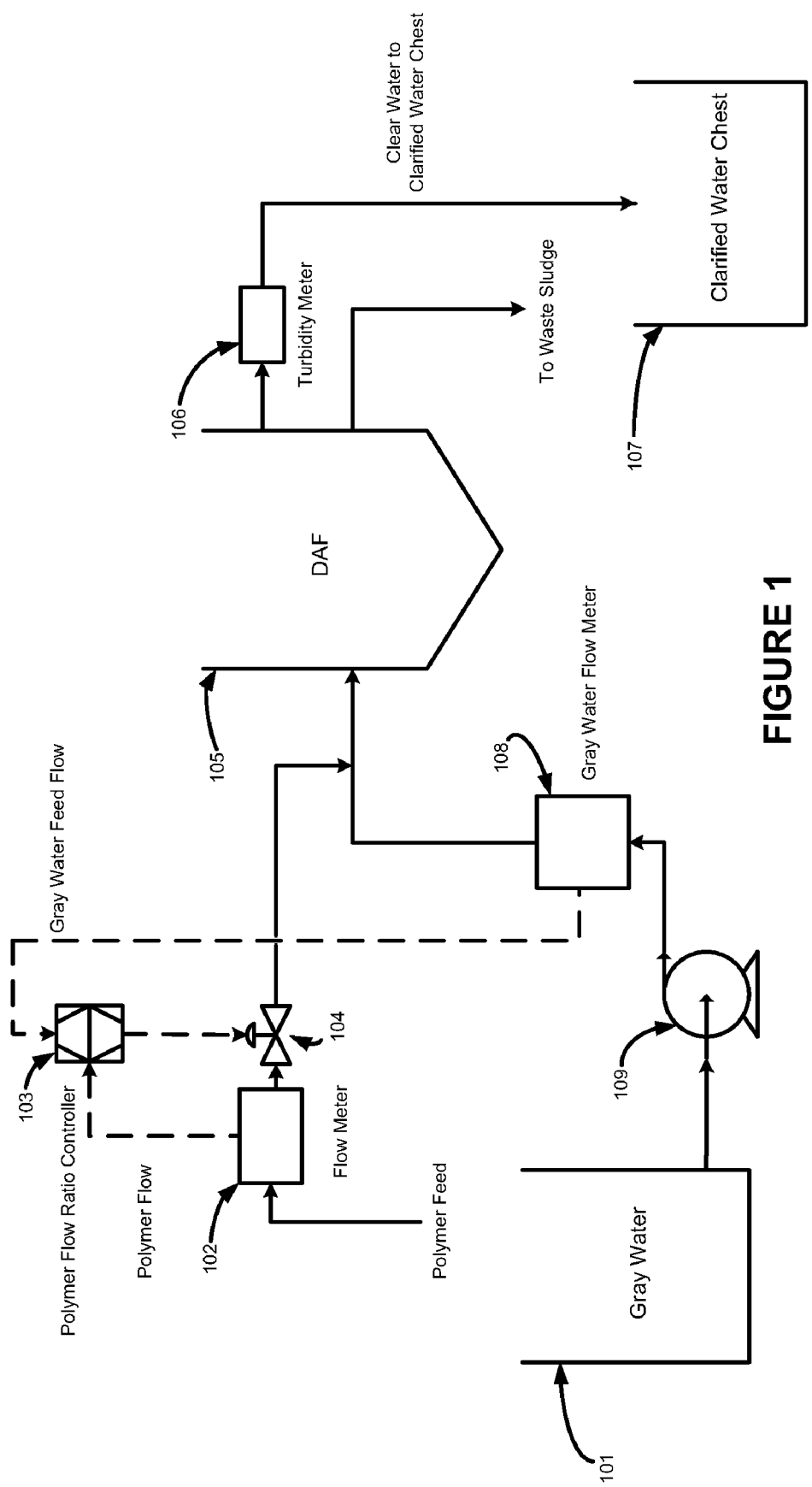
FIG. 1 is a simplified schematic of a known dewatering process including a dissolved air flotation device.
Figure 2:
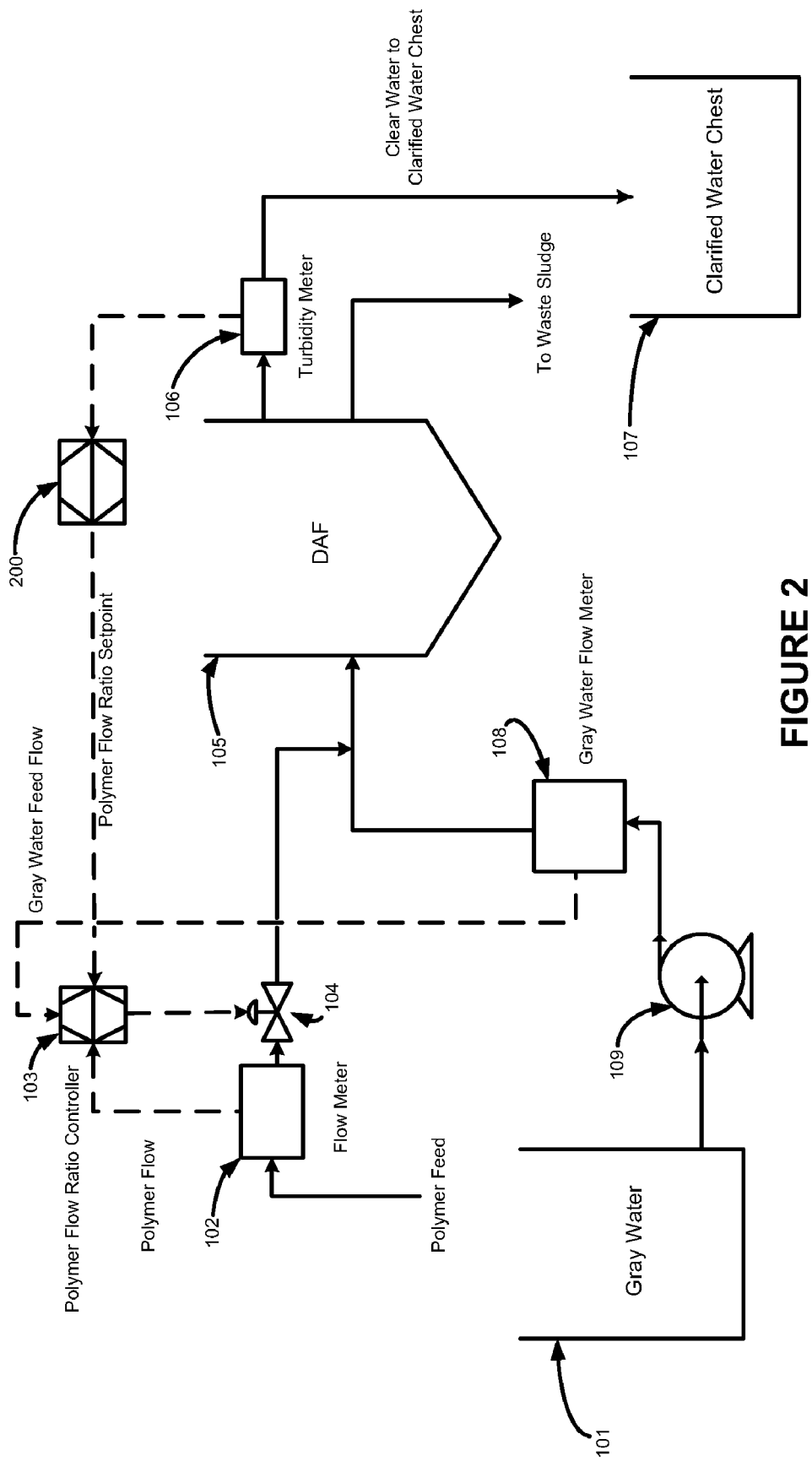
FIG. 2 is a simplified schematic of a first embodiment of the present inventive apparatus implemented within a dewatering process involving dissolved air flotation.

FIG. 2 shows a simplified schematic of a first embodiment of the present inventive apparatus implemented within a dewatering process involving dissolved air flotation. As the basic physical architecture within FIG. 2 is substantially similar to prior art FIG. 1, like numerals are used for like elements.

As before, gray water is supplied to a tank 101 as effluent from some known industrial process (not shown). A pump 109 moves the gray water through a line to a diffused air flotation device (DAF) 105. A flow meter 108 typically resides in the line between the pump 109 and DAF 105 in order to provide information on the rate of gray water flow to the DAF 105. This information is used by a controller 103 that controls the flow ratio of polymer additive relative to gray water. To that end, another flow meter 102 is provided in the polymer feed line so as to provide polymer flow information to the controller 103. As a product of the flocculation within the DAF 105, waste sludge is separated from the gray water in a manner well known to one skilled in the art of dewatering processes. Removal of the sludge results in a clarified water byproduct having a certain measurable turbidity. A turbidity meter 106 is used to monitor the clarified water byproduct for the desired turbidity readings prior to collection of the clarified water in some form of tank 107.

Similar to the prior art dewatering apparatus in FIG. 1, the controller 103 uses the information garnered from the flow meters 102 and 108 in order to regulate the polymer flow rate via polymer flow regulator 104 which thereby meters the flow of polymer thus added to the gray water to facilitate flocculation within the DAF 105. However, the present invention utilizes a dynamic set point for the polymer flow ratio controller 103. Such set point is a dynamic polymer flow ratio set point that varies over time and thereby compensates for ongoing chemical, temperature, and DAF mechanical changes. The set point utilizes real-time turbidity measurements from the turbidity meter 106 to establish optimal filtrate clarity as a moving target, rather than rely upon a static, manually-set polymer flow ratio at the controller 103. This is accomplished by way of an optimization module 200 embodied in computer software and hardware that may include an application specific integrated circuit (ASIC), field-programmable gate array (FPGA), or any other type of discrete integrated circuit or central processing unit operating via a computer code from a hard drive, compact disk read-only memory (CD-ROM) device, or any other memory device, or similar computing device or devices.

It should be understood that the present invention provides several important environmental and economic benefits when used in conjunction with paper machine DAF processing. Through such implementation, improvements may be shown in increased paper machine throughput and wet end clothing life. As well, usage of flocculation chemicals may be significantly reduced more than 50%. Such benefits therefore increase the profitability of papermaking machinery The underlying methodology embodied within the optimization module 200 is further shown and described by way of FIGS. 3*a* and 3*b* which show flowcharts for a first method in accordance with the first embodiment of the present invention as shown in FIG. 2. While specific measurements and settings are used as turbidity thresholds, delays, and polymer adjustment increments, it should be readily understood that all such measurements and settings may vary in accordance with the given industrial application using the inventive methodology without straying from the intended scope of the present invention. Such measurements and settings are tuning parameters which may vary in accordance with the given system in which the invention is implemented. Therefore, it should be understood that such measurements and settings as discussed herein below are illustrative of the present embodiments with regard to a DAF device and should not be considered limiting in terms of the instant invention.

The method shown is accomplished via continuous monitoring of the DAF outlet turbidity by means of the turbidity meter 106 and optimization module 200. The operator will first enable the flock polymer control strategy in accordance with the present inventive method which will test the DAF outlet turbidity and determine whether the turbidity is greater than 10 NTU. The inventive method includes a first determination of a preferred flocking anionic polymer (i.e., flock) level, and if required, a second determination of a cationic polymer (i.e., cat polymer) level.

Figure 3A:
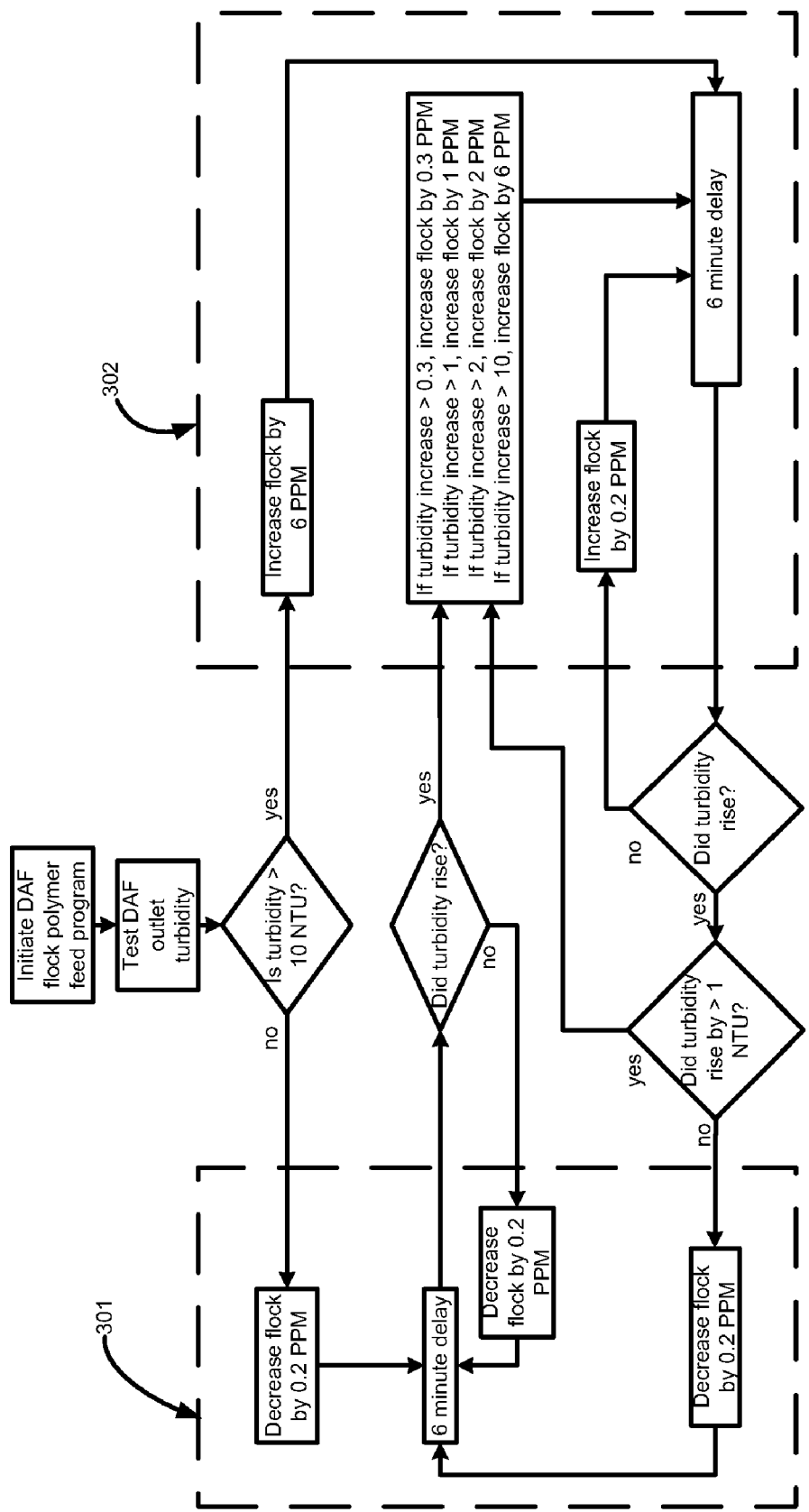
FIGS. 3a and 3b are flowcharts in accordance with a first method in accordance with the first embodiment of the present invention as shown in FIG. 2.

In FIG. 3, the process logic underlying the invention is shown in terms of a decrease loop 301 and an increase loop 302 with determining control logic there between. In general, the determining control logic serves to determine filtrate clarity of a given output of a flocculated effluent (DAF outlet shown as example). In accordance with this determining control logic, the decrease loop 301 and increase loop 302 serve to automatically adjust flock supplied to the flocculated effluent and continue to perform this function so as to locate the optimum filtrate clarity. Similarly, In FIG. 3*a*, the process logic underlying the invention is shown in terms of a decrease loop 3001 and an increase loop 3002 with determining control logic there between. In general, the determining control logic serves to determine filtrate clarity of a given output of a flocculated effluent (DAF outlet shown as example). In accordance with this determining control logic, the decrease loop 3001 and increase loop 3002 serve to automatically adjust cat polymer supplied to the flocculated effluent and continue to perform this function so as to maintain optimum filtrate clarity. Each increase and decrease loop form command logic and include delays which are provided to allow for the given polymer adjustments to take effect within the flocculated effluent.

With specific reference to FIG. 3*a*, the initial turbidity is tested.

If such initial turbidity at the outset is greater than 10 NTU, then the flock flow rate is increased by 6 parts per million (PPM). After an initial six minute delay to allow for flocculation changes, the turbidity is again checked. It should be understood that turbidity changes mentioned throughout in regards to the present methodology are in terms of an increase or decrease in NTU readings with a variable (±) bias applied to the indicated NTU target. Such bias is specific to the given system requirements in any given implementation of the present invention.

If, after the initial six minute delay, an improvement in the turbidity occurred (i.e., the NTU reading decreased±any applicable bias), then the flock is increased by 0.2 PPM and the turbidity is checked again after another six minute delay. If the turbidity became worse (i.e., the NTU reading increased±any applicable bias), then the flock is decreased by 0.2 PPM and after a six minute delay repetitively reduced by another 0.2 PPM and subsequent six minute delay until the turbidity fails to improve. At such point when turbidity fails to improve (i.e., turbidity increases), then the flock is increased relative to the increase in turbidity in accordance with four levels. Specifically, if the turbidity increases more than 0.3 NTU, then the flock will increase by 0.3 PPM, more than 1 NTU, then the flock will be increased by 1 PPM. However, if the turbidity increases more than 2 NTUs, then the flock will be increased by 2 PPM. Further, if the turbidity increases more than 10 NTUs, then the flock will be increased by 6 PPM. After such specific increase, a six minute delay would again be imposed and the turbidity again determined.

If, after the initial six minute delay, the turbidity is worse by more than 1 NTU, then the flock is increased relative to the increase in turbidity in accordance with 3 levels above 1 NTU. Specifically, if the turbidity increases more than 1 NTU, then the flock will increase by 1 PPM, more than 2 NTU, then the flock will be increased by 2 PPM. Further, if the turbidity increases more than 10 NTUs, then the flock will be increased by 6 PPM. After such specific increase, a six minute delay would again be imposed and the turbidity again determined.

If such initial turbidity at the outset is less than 10 NTU, then the flock flow rate is decreased by 0.2 PPM and after a six minute delay repetitively reduced by another 0.2 PPM and subsequent six minute delay until the turbidity fails to improve. At such point when turbidity fails to improve (i.e., turbidity increases), then the flock is increased relative to the increase in turbidity in accordance with four levels. Specifically, if the turbidity increases more than 0.3 NTU, the flock will be increased by 0.3 PPM, more than 1 NTU, then the flock will be increased by 1 PPM. However, if the turbidity increases more than 2 NTUs, then the flock will be increased by 2 PPM. Further, if the turbidity increases more than 10 NTUs, then the flock will be increased by 6 PPM. After such specific increase, a six minute delay would again be imposed and the turbidity again determined.

Figure 3B:
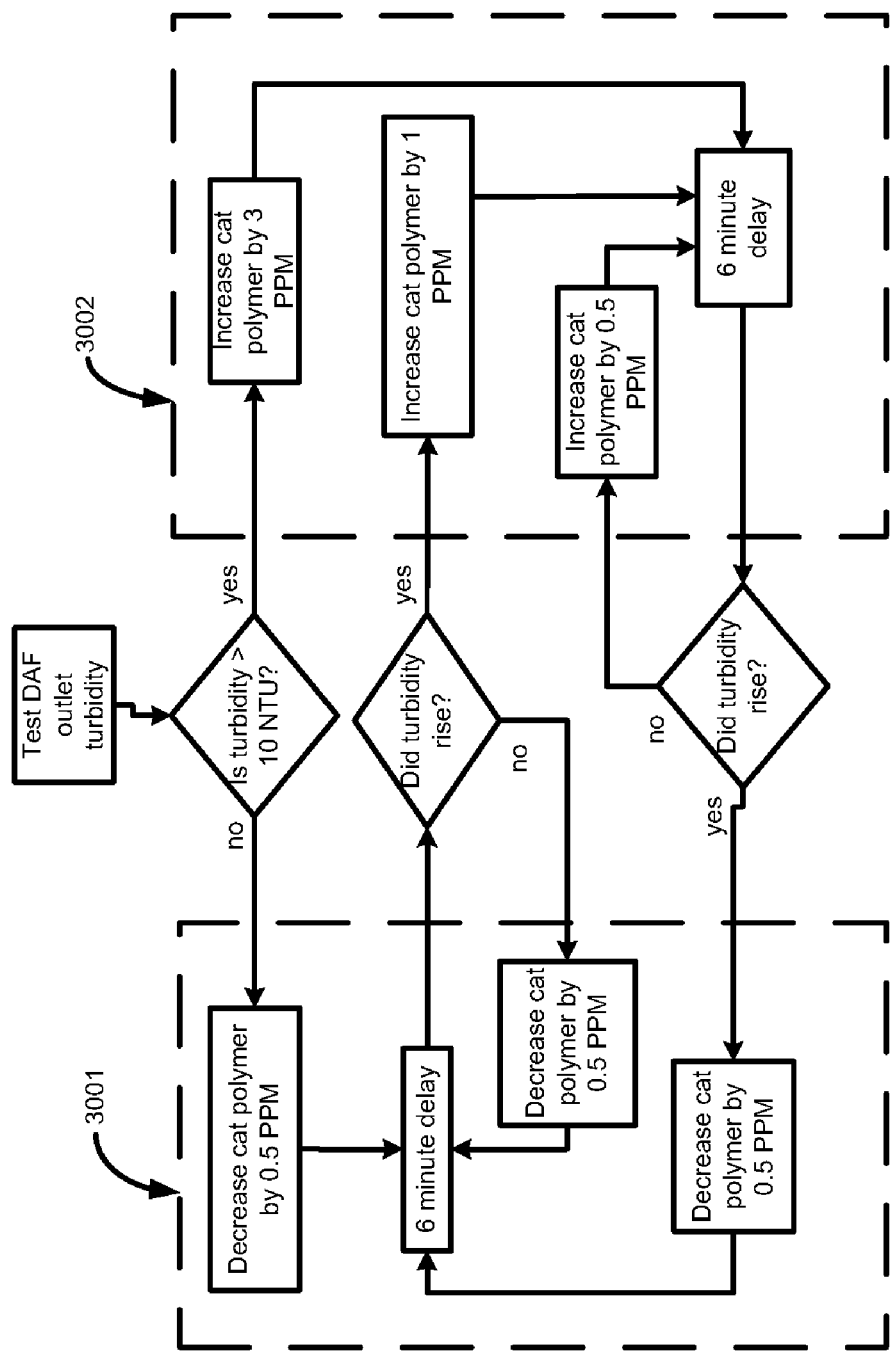

Finally, upon which time the turbidity fails to improve after significant flock polymer increases the operator may choose to adjust the level of cat polymer based on offsetting chemistries. The operator may therefore suspend the flock polymer optimization program illustrated in FIG. 3a and initiate the coagulant program as illustrated in FIG. 3b. In such instance, this will run the coagulant until the flock polymer returns to activity then stop the coagulant program and re-initiate the flock program.

With specific reference to FIG. 3b, the initial turbidity is tested.

If such initial turbidity at the outset is greater than 10 NTU, then the cat polymer flow rate is increased by 3 parts per million (PPM). After an initial six minute delay to allow for flocculation changes, the turbidity is again checked.

If, after the initial six minute delay, an improvement in the turbidity occurred (i.e., the NTU reading decreased), then the cat polymer is increased by 1 PPM and the turbidity is checked again after another six minute delay. If the turbidity became worse (i.e., the NTU reading increased) then the cat polymer is decreased by 0.5 PPM and after a six minute delay repetitively reduced by another 0.5 PPM and subsequent six minute delay until the turbidity fails to improve. At such point when turbidity fails to improve (i.e., turbidity increases), then the cat polymer is increased by 1 PPM.

If such initial turbidity at the outset is less than 10 NTU, then the cat polymer flow rate is decreased by 0.5 PPM and after a six minute delay repetitively reduced by another 0.5 PPM and subsequent six minute delay until the turbidity fails to improve. At such point when turbidity fails to improve (i.e., turbidity increases), then the cat polymer is increased by 1 PPM. After such specific increase, a six minute delay would again be imposed and the turbidity again determined by relative filtrate clarity.

This process is continuous and dynamic and functions to optimize the polymer usage over time in an automated feedback control manner. While optimum filtrate clarity in the DAF implementation is possible by way of the present invention as already described, it should be understood that any dewatering or similar water cleansing process that utilizes retention aids and/or polymers to impact endpoint water clarity can benefit from the underlying feedback mechanisms illustrated by the present invention. Such various processes may include, without limitation, paper machine tray solids processing; water clarification processes for waste treatment, papermaking, mining, or any related industrial process; or sludge dewatering.

Figure 5:
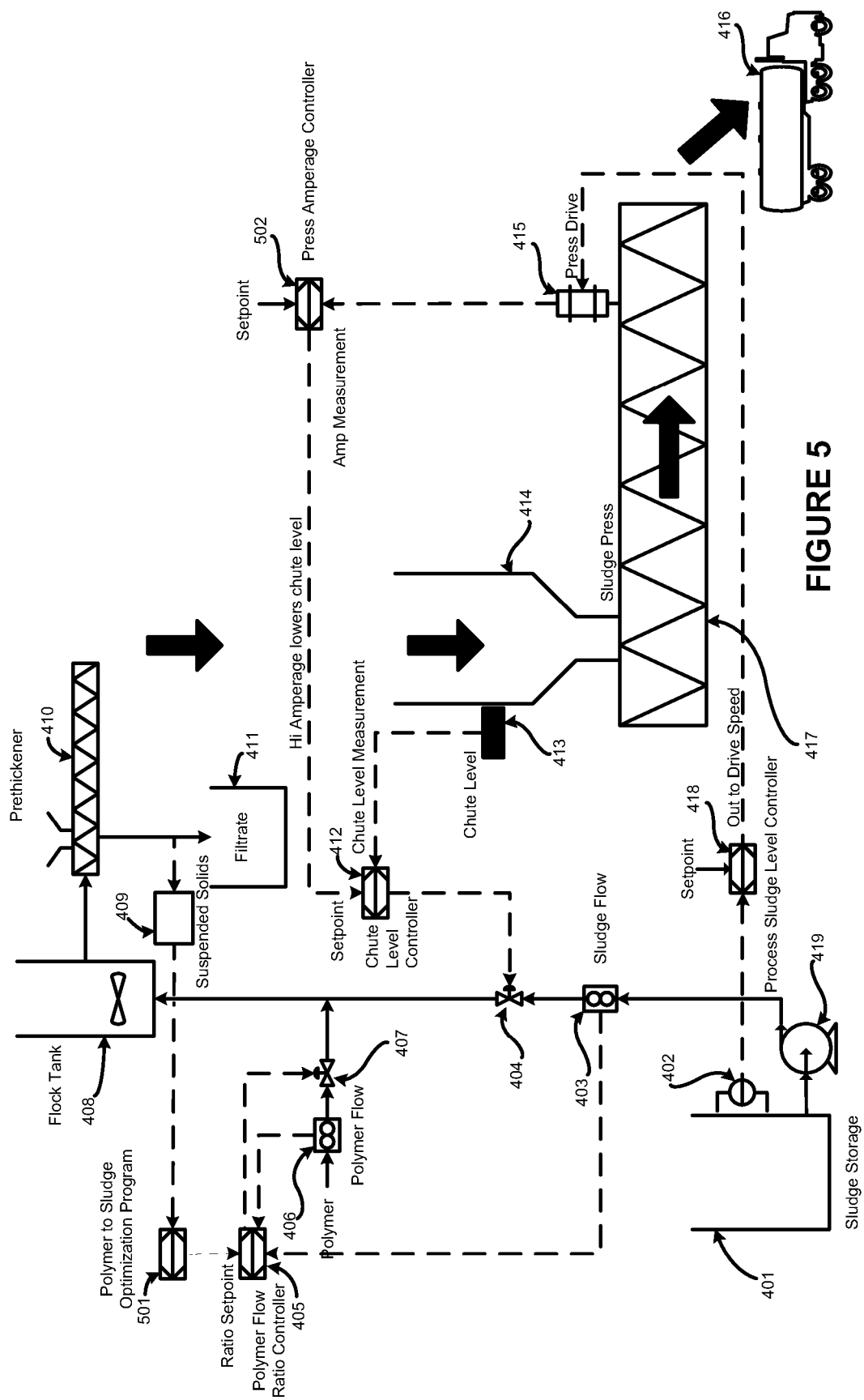
FIG. 5 is a simplified schematic of a second embodiment of the present inventive apparatus implemented within a dewatering process involving a sludge press device.

Sludge dewatering as an implementation of the present invention is shown by way of FIG. 5 which is a simplified schematic of a second embodiment of the present inventive apparatus implemented within a dewatering process involving a sludge press device. Again, while specific measurements and settings are used as turbidity thresholds, delays, and polymer adjustment increments, it should be readily understood that all such measurements and settings may vary in accordance with the given industrial application using the inventive methodology without straying from the intended scope of the present invention. Therefore, it should be understood that such measurements and settings as discussed herein below are illustrative of the present embodiments with regard to a sludge press device and should not be considered limiting in terms of the instant invention.

In general, the sludge dewatering system shown in FIG. 5 functions by configuring an amperage control scheme that controls the press feed rate by controlling press headbox level. Maximizing headbox level also contributes to greater sludge cake dryness. Controlling and limiting headbox level prevents potential press plugging. Also, press drive speed is controlled from the sludge feed tank level controller. The press will speed up as a result of sludge tank level increase caused by reduced flow to the screw press headbox caused by the high amperage control reduction of the headbox level set point. A direct flow reduction scheme can also be employed. The present inventive plug protection control loop allows the operator to more comfortably operate to a higher press drive amperage set point driving higher cake dryness as illustrated by the "optimum amperage target" shown in FIG. 8. The present invention thus provides a mechanism to allow the optimum polymer control and maximum headbox level to produce the highest cake dryness while protecting the press from plugging.

Figure 4:
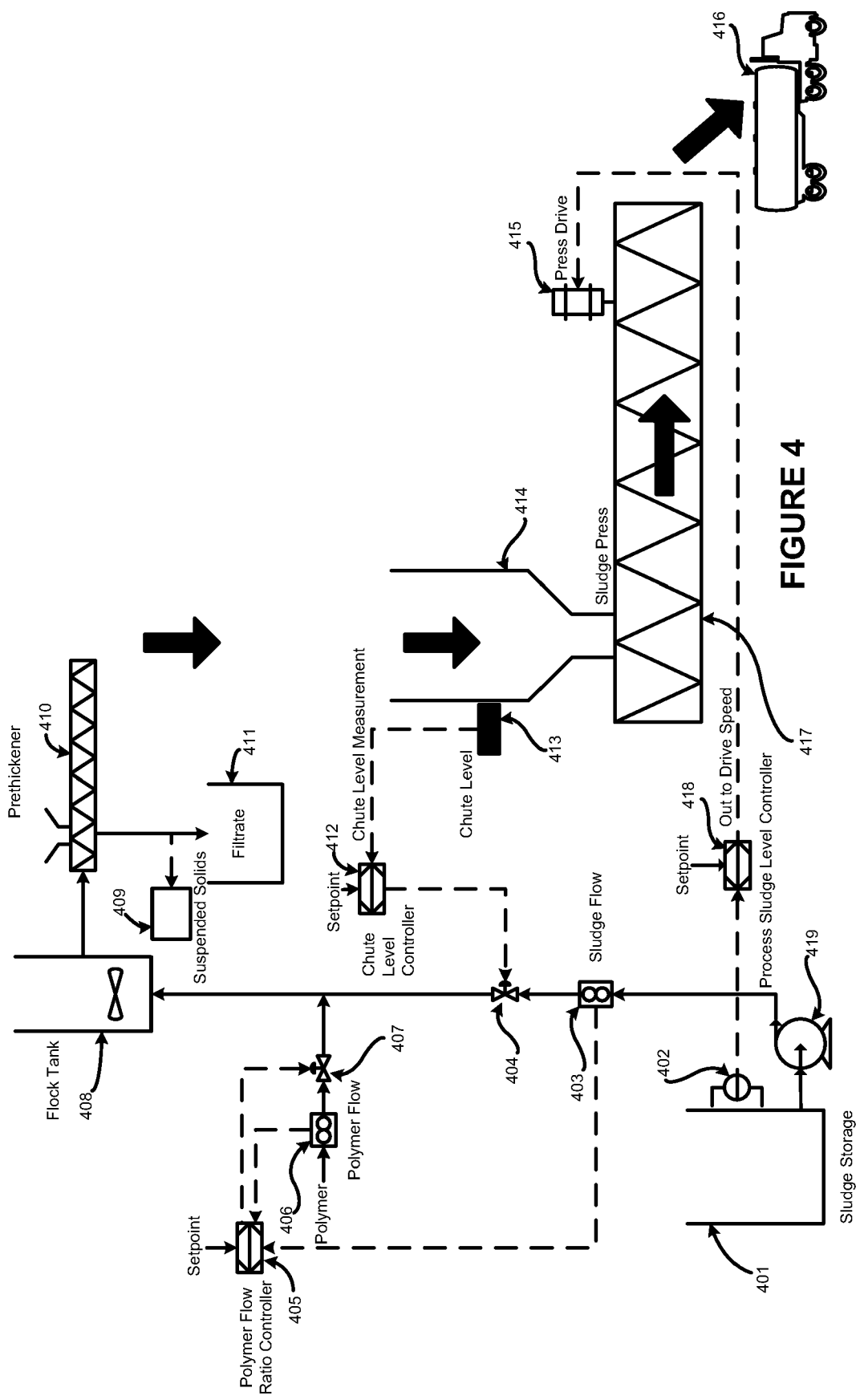
FIG. 4 is a simplified schematic of a known dewatering process involving a sludge press device.

As the basic physical architecture within FIG. 5 is substantially similar to prior art FIG. 4, like numerals are used for like elements.

As before, there is shown a dewatering mechanism involving a sludge press device 417. In contrast to the dewatering process shown in FIG. 1 which end with sludge, the apparatus of FIG. 5 begins the dewatering process with relatively aqueous sludge in storage 401 that is pumped via sludge pump 419 to a flocculation tank 408. A sludge flow meter 403 provides data to a controller 405 which, in conjunction with a polymer flow meter 406, controls the polymer flow ratio by way of a polymer regulator 407 which adds a flocculating polymer to the sludge prior to agitation in the flocculation tank 408. The sludge may then be treated with a pre-thickener within a first stage press 410 whereby a filtrate may be released from the sludge to a filtrate tank 411 and the suspended solids remaining in the filtrate monitored by a suspended solids meter 409. In a manner similar to the first embodiment described above, the data from the suspended solids meter 409 is fed back to an optimization module 501 that provides a dynamic set point for the polymer ratio controller 405 by way of the suspended solids reading in terms of turbidity (i.e., NTUs). The underlying methodology used by the optimization module 501 is discussed further with regard to FIG. 6.

The pre-thickened sludge is then deposited into the chute 414 of the final stage sludge press 417. The level of sludge in the chute is monitored by a chute level transmitter 413 and chute level controller 412 which controls the sludge flow 404 in accordance with a dynamic chute controller set point established in an automated manner by a press amperage controller 502. In addition to the plugging of the press 417 being a function of the sludge dryness as mentioned in the background section above in regard to FIG. 8, it is also noted that the relationship of press amperage is a good indicator of sludge dryness. Accordingly, any increase seen in press amperage will result within the present invention in a corresponding decrease in the set point of the chute level controller. The sludge press 417 is run by an electromechanical press drive 415.

It should be readily apparent that both the optimization module 501 and the press amperage controller 502 may be embodied in computer software and hardware that may include an ASIC, FPGA, or any other type of discrete integrated circuit or central processing unit operating via a computer code from a hard drive, CD-ROM device, or any other memory device, or similar computing device or devices.

The press drive 415 itself is controlled by a sludge level controller 418 such that the drive speed of the press drive 415 is maintained at a level set point established manually by the sludge press operator. This set point is relative to the level of sludge in sludge storage tank 401 as determined by a sludge tank measurement device 402. Because the set points for the polymer flow ratio controller 405 and chute level controller 412 are automated in accordance with the present invention to provide optimal polymer flow by real-time turbidity monitoring and optimal chute level control by real-time press amperage monitoring, optimal dewatering levels for sludge cakes outputted by sludge press 417 can be realized prior to transport and disposal by sludge carriers 416. Advantageously, these optimized set points continuously monitor and maintain the implementation so as to prevent plugging of the sludge press. In addition to the plugging of the press 417 being a function of the sludge dryness as mentioned in the background section above in regard to FIG. 8, it is also noted that the relationship of press amperage is a good indicator of sludge dryness. Such optimization has been shown to result in increased throughput and increased dewatering capabilities.

It is also within the scope of the present invention to utilize the press speed control loop based on the sludge supply tank feed level to work in conjunction with the sludge level controller 418. This controls and limits press amperage by speeding up the press as the level in the sludge feed tank rises as a result of the sludge flow decrease to the press caused by a press drive high amperage situation. The increased speed would serve to clear the press more quickly, returning the press to a safe amperage position.

Figure 6:
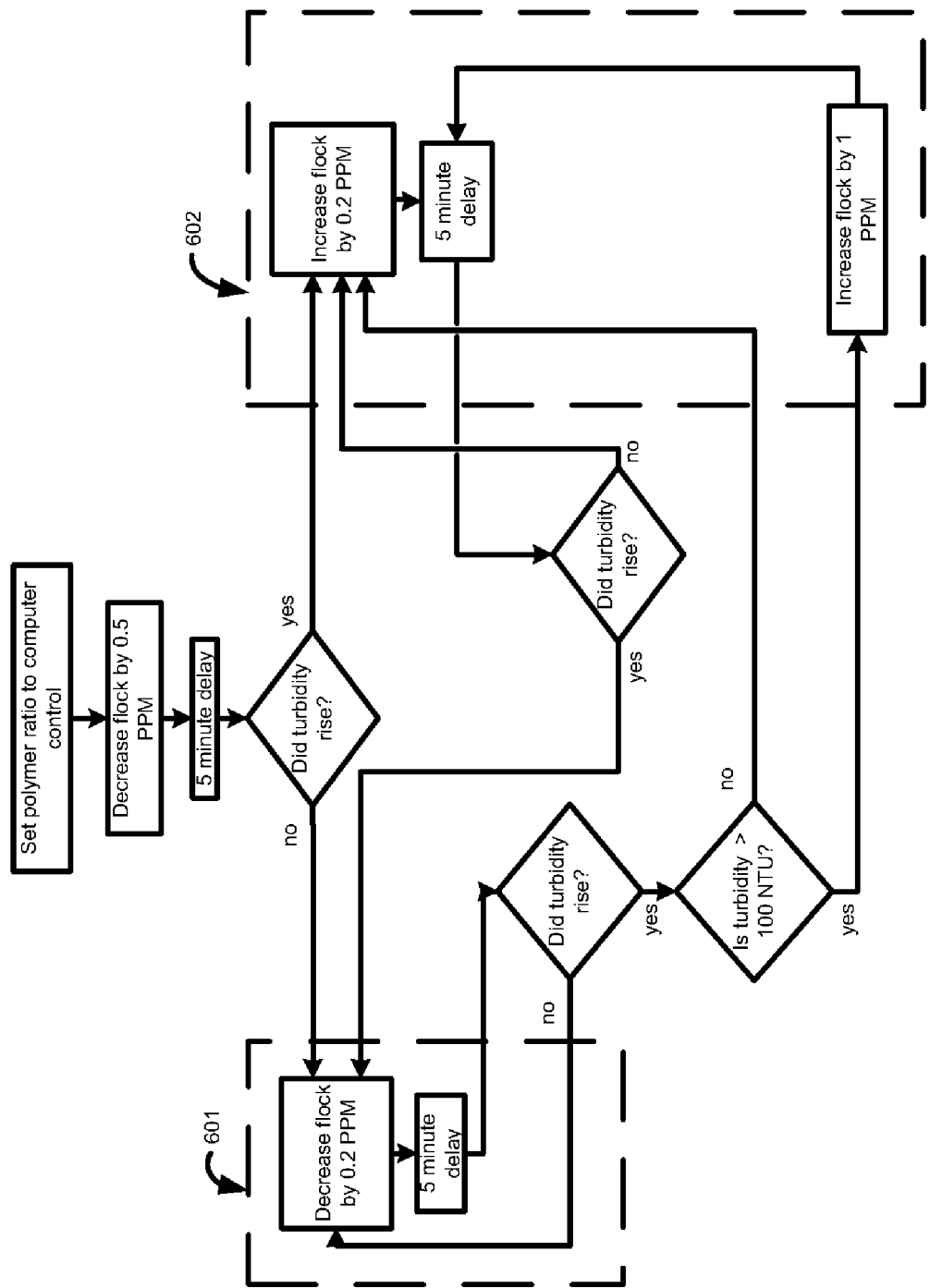
FIG. 6 is a flowchart in accordance with a second method in accordance with the second embodiment of the present invention as shown in FIG. 5.
Figure 6A:
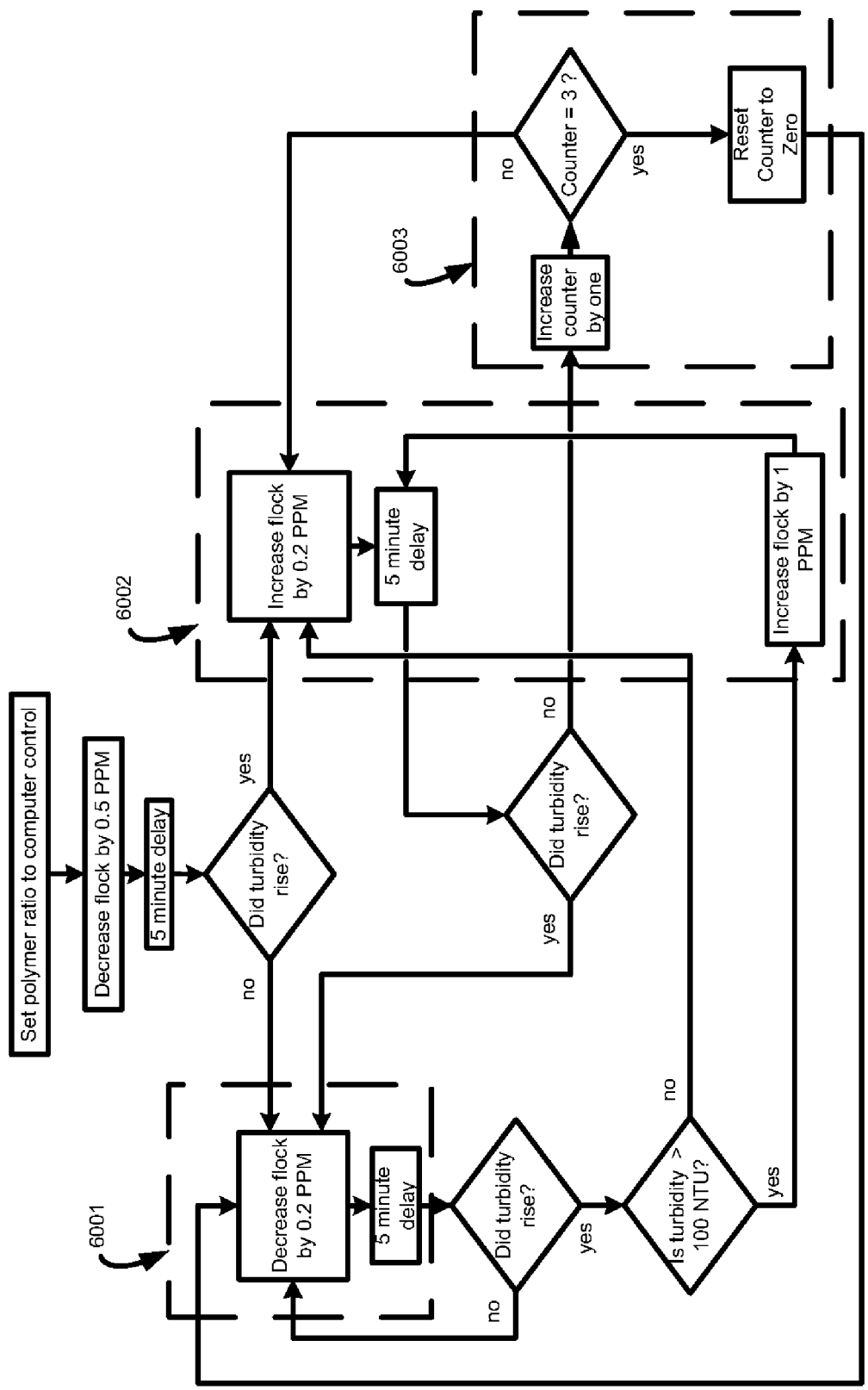
FIG. 6a is a flowchart in accordance with an alternative embodiment of the method of FIG. 6.
Figure 7:
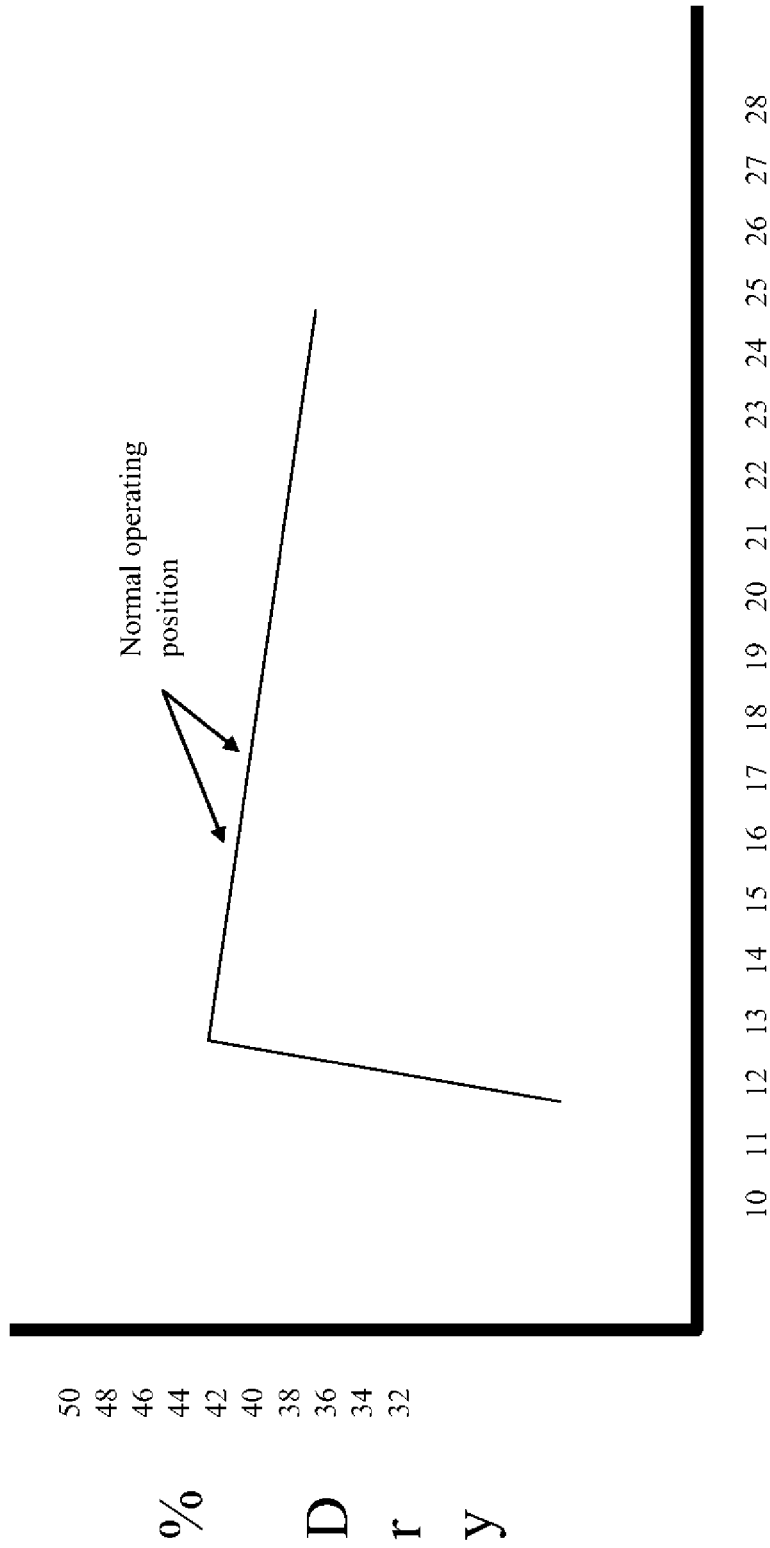
FIG. 7 is a graphical representation of sludge dryness relative to polymer flow within dewatering processes applicable to the present invention.

The underlying methodology embodied within the optimization module 501 is further shown and described by way of FIG. 6 and FIG. 6a which show flowcharts for a first method in accordance with the second embodiment and third embodiments of the present invention as generally shown in FIG. 5. The processes illustrated by way of FIG. 6 and FIG. 6a disclose a "hill climbing scheme" that is utilized to locate the optimum filtrate clarity by manipulating the sludge feed ratio. The method shown is accomplished via continuous monitoring of the filtrate turbidity by means of the suspended solids meter 409 and optimization module 501.

In FIG. 6, the process logic underlying the invention is shown in terms of a decrease loop 601 and an increase loop 602 with determining control logic there between. In general, the determining control logic serves to determine filtrate clarity of a given output of a flocculated effluent (pre thickener sludge filtrate outlet shown as example). In accordance with this determining control logic, the decrease loop 601 and decrease loop 602 serve to automatically adjust flock supplied to the flocculated sludge effluent and continue to perform this function so as to maintain optimum filtrate clarity. Similarly, In FIG. 6a, the process logic underlying an alternative embodiment of the invention is shown in terms of a decrease loop 6001 and an increase loop 6002 with determining control logic there between which together function identically to FIG. 6. However, FIG. 6a further includes a counter loop 6003 explained in further detail below.

In general, the determining control logic serves to determine filtrate clarity of a given output of a flocculated effluent (sludge filtrate outlet shown as example). In accordance with this determining control logic, the decrease loop 6001 and increase loop 6002 serve to automatically adjust polymer supplied to the flocculated effluent and continue to perform this function so as to maintain the optimum filtrate clarity. Each increase and decrease loop form command logic and include delays which are provided to allow for the given polymer adjustments to take effect within the flocculated effluent.

With specific reference to FIG. 6, the initial polymer ratio is set to computer control and the polymer flow rate is decreased by 0.5 PPM. After a five minute delay to allow for flocculation changes, the turbidity is checked. Again, it should be understood that turbidity changes mentioned throughout in regards to the present methodology are in terms of an increase or decrease in NTU readings with a variable (±) bias applied to the indicated NTU target. Such bias is specific to the given system requirements in any given implementation of the present invention.

For processes with a relative flat improvement curve, an optional feature is possible as illustrated in FIG. 6a in an alternative illustrative embodiment of the present invention. In such optional embodiment, the counter loop 6003 as mentioned above is added to FIG. 6. The counter loop 6003 is utilized to appropriately bias the polymer flow to the optimum setting. When polymer ratio set points are in the increase direction, repetitive counts are tracked. After a predetermined number of increases occur (e.g., 3 are shown for purposes of illustration though such count number may vary according to implementation), the process is reversed and a decrease polymer ratio flow occurs. At that time, the counter is reset to zero and the program returns to a normal turbidity tracking mode.

If the initial turbidity check indicates an improvement in turbidity, then the flock is decreased by 0.2 PPM and again checked after a five minute delay which is repeated in conjunction with further 0.2 PPM decreases in flock until no further improvements are sensed in turbidity. At such point, if turbidity change is greater than 100 NTU the flock is increased by 1 PPM and followed by a five minute delay. However, if turbidity change is not greater than 100 NTU the flock is increased by 0.2 PPM and followed by the five minute delay. After the five minute delay, turbidity is again checked.

If the turbidity then improves, the flock is increased by 0.2 PPM and again checked after a five minute delay which is repeated in conjunction with further 0.2 PPM increases in flock until no further improvements are sensed in turbidity. At that point, the flock is decreased and subjected again to the decrease in flock by 0.2 PPM and subsequent steps as above.

However, if the turbidity then fails to improves, the flock is immediately subjected to the increase flock logic.

This process is continuous and dynamic and functions to optimize the polymer usage over time in an automated feedback control manner.

It should be understood that the present invention provides several important environmental and economic benefits when used in conjunction with waste treatment processing. Through such processing in the present sludge press implementation described, improvements may be shown in increased sludge dryness from 42 to 51% dry and allowed boiler systems to increase sludge burn from 40 to 62 tons per day (TPD). For a typical ash content of 30%, sludge landfill disposal volume can be reduced by more than ⅔. In this example, more than 10,000 cubic yards reduction of landfill volume per year may be realized. In a wood fuel burning environment, the boiler particulate can be reduced by 13% resulting from the dry sludge binding the airborne wood fines to the grate and reducing wood fine particulate carry over. Landfill stability can be significantly improved as a result of the increased ash versus sludge tons. In terms of energy, sludge at 50% dry had a BTU content of 2600 BTU/lb. At 22 TPD added burn, oil usage can be reduced in some cases by 35,000 barrels of oil per year.

The present invention includes many useful applications within de-watering processes including, but not limited to, automatically adjusting retention aids flow set point to a paper machine so as to optimize the fan pump water clarity, automatically adjusting the polymer flow set point to a DAF unit so as to provide optimum filtrate clarity while minimizing polymer usage, and combining automatic polymer flow control set point adjustment with press drive over amperage control so as to optimize press sludge cake dryness while protecting the press from plugging.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for optimizing a dewatering process producing dewatered sludge and clarified water from a flocculated effluent, said method comprising the steps:
    a) determining clarity of an output of said clarified water;
    b) automatically adjusting flocculant supplied to said flocculated effluent, said automatically adjusting flocculant step having an increase loop and a decrease loop which, respectively, increase and decrease said flocculant supplied to said effluent based upon said clarity, and said increase loop includes increasing said flocculant in accordance with predetermined levels which vary in accordance with changes detected in said clarity, said increase loop and said decrease loop including delays which are provided to allow for the flocculant adjustment to take effect in said flocculated effluent;
    c) re-determining said clarity of said clarified water; and
    d) repeating steps b) and c) continuously during dewatering of said flocculated effluent to produce said dewatered sludge so as to maintain said clarity within a predetermined range.

2. The method as claimed in claim 1 wherein said determining and re-determining are embodied in determining logic and said increase loop and said decrease loop are embodied in command logic.

3. The method as claimed in claim 2 wherein said determining logic and said command logic are implemented within a computer readable medium.

4. The method as claimed in claim 2 wherein said determining logic and said command logic are implemented within programmable hardware.

5. The method as claimed in claim 2 wherein said output is obtained from a dissolved air flotation device outlet.

6. The method as claimed in claim 2 wherein said output is obtained from a sludge filtrate outlet.

7. The method as claimed in claim 6, said method further including
    increasing a counter incrementally when said adjusting is operating within said increase loop,
    reversing said adjusting to operate within said decrease loop upon reaching a predetermined value within said counter, and
    resetting said counter.

8. The method as claimed in claim 6, said method further including
    monitoring a sludge level of said dewatered sludge within a sludge press chute and
    adjusting a chute controller set point in response to a press amperage controller signal
    wherein any increase in press amperage results in a corresponding decrease in said chute controller set point.

9. The method as claimed in claim 2 wherein said flocculant is an anionic polymer.

10. The method as claimed in claim 2 wherein said flocculant is a cationic polymer.

11. A method for optimizing a dewatering process, said method comprising the steps:
    a) determining turbidity of clarified water obtained from a dissolved air flotation (DAF) device outlet producing dewatered sludge and said clarified water from a flocculated effluent;
    b) automatically adjusting flocculant supplied to said DAF, said automatically adjusting flocculant step having an increase loop and a decrease loop which, respectively, increase and decrease said flocculant supplied to said DAF based upon said turbidity, and said increase loop includes increasing said flocculant in accordance with predetermined levels which vary in accordance with changes detected in said turbidity, said increase loop and said decrease loop including delays which are provided to allow for the flocculant adjustment to take effect in said flocculated effluent;
    c) re-determining said turbidity of said clarified water; and
    d) repeating steps b) and c) continuously during dewatering of said flocculated output to produce clarified water and dewatered sludge so as to maintain said turbidity within a predetermined range.

12. The method as claimed in claim 11 wherein said determining and re-determining are embodied in determining logic and said increase loop and said decrease loop are embodied in command logic.

13. The method as claimed in claim 12 wherein said determining logic and said command logic are implemented within a computer readable medium.

14. The method as claimed in claim 12 wherein said determining logic and said command logic are implemented within programmable hardware.

15. The method as claimed in claim 12 wherein said flocculant is an anionic polymer.

16. The method as claimed in claim 12 wherein said flocculant is a cationic polymer.

* * * * *